United States Patent
Holley

[15] 3,647,221
[45] Mar. 7, 1972

[54] PAINTED GOLF BALL METHOD AND STRUCTURE

[72] Inventor: Danforth Holley, Grosse Pointe Shores, Mich.

[73] Assignee: Holley Plastics Company, Warren, Mich.

[22] Filed: Sept. 15, 1969

[21] Appl. No.: 857,778

[52] U.S. Cl. ............................273/235, 117/38, 117/47 A, 117/72, 117/138.8 D, 117/161 KP, 273/218, 273/DIG. 8
[51] Int. Cl. ..................................A63b 37/00, B44d 1/092
[58] Field of Search ...................117/47 A, 138.8 D, 161 KP, 117/72, 38; 273/218, 235, DIG. 8

[56] References Cited

UNITED STATES PATENTS

| | | | |
|---|---|---|---|
| 2,729,618 | 1/1056 | Muller et al. | 260/75 TN |
| 3,282,200 | 11/1966 | Brandell | 117/38 X |
| 3,384,612 | 5/1968 | Brandt et al. | 273/218 X |
| 3,454,676 | 7/1969 | Busse | 273/218 X |
| 3,515,567 | 6/1970 | Tani et al. | 117/47 A X |

FOREIGN PATENTS OR APPLICATIONS 653,570  12/1962  Canada..................................273/235

*Primary Examiner*—Murray Katz
*Assistant Examiner*—Ralph Husack
*Attorney*—Whittemore, Hulbert & Belknap

[57] ABSTRACT

A method of producing a urethane painted solid polyurethane golf ball and the resulting structure. The steps in painting a solid polyurethane golf ball include soaking the golf ball in an acetone bath for approximately 20 minutes with intermittent agitation, applying a first coat of pigmented urethane paint to the golf ball approximately 5 hours after removing the golf ball from the acetone bath, applying a second coat of pigmented urethane paint to the golf ball approximately 10 hours after the first coat of paint has been applied thereto, stamping the golf ball 10 hours after the second coat of paint has been applied thereto, and clear coating the golf ball with a coat of clear urethane paint after it has been stamped. In the resulting painted golf ball structure, the paint adheres strongly to the golf ball due to the initial acetone treatment of the golf ball.

12 Claims, 2 Drawing Figures

PATENTED MAR 7 1972                                        3,647,221

INVENTOR.
DANFORTH HOLLEY
BY Whittemore,
Hulbert & Belknap
ATTORNEYS

PAINTED GOLF BALL METHOD AND STRUCTURE

BACKGROUND OF THE INVENTION

1. Field of the Invention

The invention relates to golf balls and refers more specifically to a method of coating plastic solid polyurethane golf balls by soaking the balls in an acetone bath prior to painting with urethane golf ball paint to provide a resulting golf ball structure having a painted surface which adheres strongly to the golf ball.

2. Description of the Prior Art

In the past painting of golf balls to provide the usual white finish or in some instances finishes of other colors or combination of colors has been unsatisfactory in that in use the paint applied by previous methods has often chipped, pealed or otherwise deteriorated. Various methods have been used in attempting to strongly adhere paint to the surface of golf balls and in particular to the surface of presently popular solid plastic golf balls which have a much longer playing life than golf balls having a rubber wound core and plastic cover and therefore require a finish which will last over the longer playing life of the solid plastic golf balls. One such method includes first blasting the surface of a golf ball to be painted with fine particles of very hard material or otherwise roughing the surface of the golf ball, subsequently cleaning the roughened golf ball surface by ultrasonic cleaning and the like and then applying golf ball paint thereto. This method requires three separate operations and different equipment for each operation and therefore greatly increases the expense of painting the golf ball without similarly increasing the life of the paint covering of the golf ball.

SUMMARY OF THE INVENTION

In accordance with the invention a solid polyurethane golf ball is treated with acetone by immersion in an acetone bath. The golf ball is then painted with a first coat of urethane golf ball paint after it is dry. The first coat of urethane paint is followed by a second coat of urethane golf ball paint. The ball is then stamped and a clear coat of urethane golf ball paint is applied thereto. The resulting golf ball structure has a tightly adhering painted surface.

DESCRIPTION OF THE PREFERRED EMBODIMENT

Figure 1:
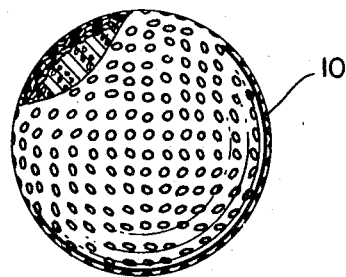
FIG. 1 is a partly broken away elevation view of golf ball structure which has been painted in accordance with the method of the invention.
Figure 2:
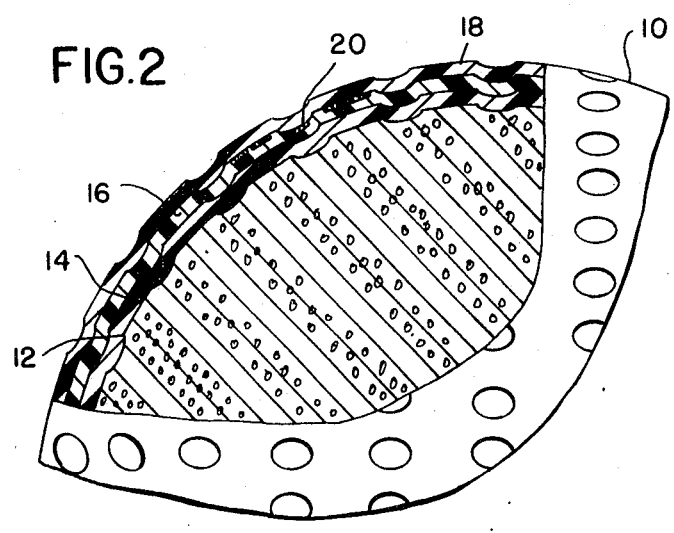
FIG. 2 is an enlarged view of the broken away portion of the golf ball structure of FIG. 1.

The golf ball structure 10 illustrated in FIG. 1 is a solid polyurethane golf ball and has a painted exterior surface. As shown better in FIG. 2, the paint on the exterior surface 12 of the golf ball 10 includes a first or inner paint coat 14, a second or intermediate paint coat 16, and a third or outer coat of paint 18. A stamping or decal 20 may be provided on the exterior surface of the intermediate coat of paint 16 and the outer coat of paint 18 may be clear to reveal the stamping or decal 20, if desired.

As shown best in FIG. 1, the golf ball 10 is a solid plastic golf ball and in a specific embodiment is a urethane golf ball, such as disclosed in the copending patent application, Ser. No. 434,227, filed Feb. 23, 1965 in the name of Warren M. Dusbiber now abandoned. The golf ball, as particularly set forth in the Dusbiber application, is made to P.G.A. specifications by compression molding, injunction molding, or the like, and is essentially a cured urethane prepolymer mixed with a curing agent and a plasticizer. It is not intended to limit the present invention to either solid plastic golf balls or golf ball covers.

Prior to applying the first or inner coat of paint 14 to the golf ball 10, the golf ball 10 is immersed in an acetone (dimethyl ketone; propanone: $CH_3COCH_3$) bath and allowed to soak for approximately 20 minutes. The golf ball 10 is agitated periodically in the acetone bath. The acetone bath cleans the ball and prepares the surface of the ball for amalgamation with the inner coat of paint 14.

After soaking in the acetone for approximately 20 minutes, the golf ball is removed from the acetone bath and is air dried for 10 to 15 minutes, after which the first coat of golf ball paint 14 is applied to the exterior surface 12 of the golf ball 10. The first coat of paint 14 may be a pigmented urethane golf ball paint, such as B271 White base coat golf ball paint as sold by the Hughson Chemical Company, Division of Lord Corporation, Erie, Pennsylvania. The first coat of paint is allowed to dry for 5 hours before the second coat of paint 16 is applied.

The second or intermediate coat of paint 16 is the same as the first or inner coat of paint 14 and again may be B271 White base coat urethane paint sold by the Hughson Chemical Company. The second coat of paint is allowed to dry for 10 hours before the golf ball is stamped.

Approximately 10 hours after the second coat of paint 16 is applied to the golf ball 10, the golf ball may be stamped with numbers, trademarks or other designations 20, as required. Decals may also be applied over the second coat of golf ball paint 16. Following the stamping of and/or placing of decals on the golf ball 10, the outer or third coat of paint 18, which may be a clear golf ball paint, such as B071 Clear top coat urethane paint from the Hughson Chemical Company, is applied to the ball 10. The clear coat of paint 18 is allowed to dry 3 to 4 hours after which the golf ball 10 is ready for packaging and shipping.

While specific urethane golf ball paints, both pigmented and clear, have been specified in the particular embodiment described herein, it is not desired to limit the invention to the specific products indicated. Rather, the invention is primarily directed to the initial treatment of any synthetic resin article with acetone prior to painting of the article. The acetone treatment does, however, appear to be of particular advantage in painting solid polyurethane golf balls with urethane paints since it provides a particularly strong adhesion between the golf ball and the first coat of paint 14 so that the life of the paint covering more nearly matches the longer life of the ball.

What I claim as my invention is:

1. The method of painting a solid polyurethane article comprising first soaking the article in acetone, then drying the article and subsequently applying at least one coat of paint to the acetone treated article.

2. The method as set forth in claim 1, wherein the article is a golf ball and the golf ball is soaked in an acetone bath for approximately 20 minutes.

3. The method as set forth in claim 2 and further including the step of agitating the golf ball in the acetone bath.

4. The method as set forth in claim 1, wherein the article is a golf ball, two coats of golf ball paint are separately applied to the acetone treated golf ball, and drying the golf ball after each coat of paint.

5. The method as set forth in claim 4, wherein the first coat of paint is applied to the golf ball at least 5 hours after the golf ball is treated with the acetone.

6. The method as set forth in claim 5, wherein the second coat of paint is applied to the golf ball at least 10 hours after the first coat of paint is applied to the golf ball.

7. The method as set forth in claim 6 and further including the step of stamping the golf ball at least 10 hours after the second coat of paint is applied to the golf ball.

8. The method as set forth in claim 7 and further including the step of applying a coat of clear paint to the golf ball subsequent to stamping and drying the clear paint.

9. The method of painting a solid polyurethane golf ball comprising soaking the golf ball in an acetone bath for approximately 20 minutes while agitating the golf ball, drying the golf ball for at least 5 hours, applying a first coat of pigmented urethane paint to the acetone treated golf ball, drying the golf ball for at least 10 hours, applying a second coat of pigmented urethane paint to the golf ball and drying the golf ball after the second coat of paint.

10. The method as set forth in claim 9 wherein the golf ball is dried at least 10 hours after the second coat of paint is applied to the golf ball and subsequently stamping the golf ball and applying a coat of clear paint to the golf ball subsequent to stamping thereof and drying the stamped and clear painted golf ball.

11. Golf ball structure comprising a solid polyurethane golf ball having an acetone treated surface, two coats of pigmented golf ball paint applied over the acetone treated surface and a coat of clear paint applied over the second coat of pigmented paint.

12. The structure as set forth in claim 11, wherein at least one of the pigmented and clear paint is a urethane paint.

* * * * *